(12) United States Patent
Maes

(10) Patent No.: US 7,159,496 B2
(45) Date of Patent: Jan. 9, 2007

(54) PORTABLE VISE AND SAW COMBINATION

(75) Inventor: Roger V. Maes, Lakewood, CO (US)

(73) Assignee: aMaesing Tools Manufacturing Inc., Sequim, WA (US)

( * ) Notice: Subject to any disclaimer, the term of this patent is extended or adjusted under 35 U.S.C. 154(b) by 160 days.

(21) Appl. No.: 10/802,091

(22) Filed: Mar. 15, 2004

(65) Prior Publication Data

US 2005/0172769 A1  Aug. 11, 2005

Related U.S. Application Data

(63) Continuation-in-part of application No. 10/773,781, filed on Feb. 6, 2004.

(51) Int. Cl.
  *B26D 7/02* (2006.01)
  *B26B 1/20* (2006.01)
(52) U.S. Cl. ............................. 83/452; 83/54; 83/454; 83/471.2; 83/490; 83/743; 269/41; 269/45
(58) Field of Classification Search .................. 83/54, 83/452, 490, 169, 171, 646, 494, 168, 471.1, 83/491, 100, 745, 743, 453, 456, 471.2, 454; 269/156, 902, 268, 16, 45, 41, 43, 152, 154; 269/40, 257; 30/388; 74/337.5, 334.5; 143/47
See application file for complete search history.

(56) References Cited

U.S. PATENT DOCUMENTS

| | | | | |
|---|---|---|---|---|
| 1,541,715 A | | 6/1925 | Johnson | |
| 1,855,945 A | * | 4/1932 | Denyer | 83/745 |
| 2,735,455 A | * | 2/1956 | Forsberg | 83/745 |
| 2,747,625 A | * | 5/1956 | Small | 83/468 |
| 2,773,523 A | * | 12/1956 | Hopla | 83/745 |
| 2,778,393 A | * | 1/1957 | Golasowski | 269/63 |
| 2,823,709 A | * | 2/1958 | Konieczka | 83/745 |
| 2,876,808 A | * | 3/1959 | Ottar | 83/471.3 |
| 2,942,633 A | * | 6/1960 | King | 83/745 |
| 3,218,059 A | | 11/1965 | Andrew | |
| 3,645,307 A | * | 2/1972 | Stocker | 30/376 |
| 3,741,061 A | | 6/1973 | Bevacqua | |
| 3,757,628 A | * | 9/1973 | Camacho | 83/745 |
| 3,883,128 A | * | 5/1975 | Breese | 269/45 |
| 3,982,739 A | | 9/1976 | Maes | |
| 3,982,740 A | | 9/1976 | Gutman | |
| 4,071,061 A | * | 1/1978 | Schneider | 144/345 |
| 4,139,189 A | | 2/1979 | Wietrzyk | |
| 4,202,233 A | * | 5/1980 | Larson | 83/745 |
| 4,215,612 A | * | 8/1980 | Peel | 83/796 |
| 4,340,211 A | | 7/1982 | Chiappetti | |
| 4,370,140 A | | 1/1983 | Fegley et al. | |
| 4,377,959 A | * | 3/1983 | DeCarolis | 83/762 |

(Continued)

Primary Examiner—Boyer D. Ashley
Assistant Examiner—Ghassem Alie
(74) Attorney, Agent, or Firm—Innovation Law Group, Ltd; Jacques M. Dulin, Esq.

(57) ABSTRACT

A portable vise and saw combination includes a vise element having three attachment points. One attachment point is used to attach the vise to an existing support such as an existing horizontal rail, and another attachment point allows a saw to be mounted to the vise. A workpiece is mounted in the third attachment point. The saw is aligned with the workpiece so that the workpiece may be selectively cut at a desired length and angle. A measuring apparatus is also incorporated within the vise to allow an operator to set the saw to cut successive workpieces at the same lengths without having to remeasure each workpiece.

9 Claims, 9 Drawing Sheets

U.S. PATENT DOCUMENTS

| | | | |
|---|---|---|---|
| 4,537,105 A * | 8/1985 | Bergler | 83/471.3 |
| 4,587,875 A * | 5/1986 | Deley | 83/471.3 |
| 4,592,541 A * | 6/1986 | Huray | 269/155 |
| 4,607,829 A * | 8/1986 | Suska | 269/88 |
| 4,779,503 A * | 10/1988 | Mitchell | 83/796 |
| 4,901,444 A * | 2/1990 | Maschmeier | 33/423 |
| 5,016,510 A | 5/1991 | Gardner | |
| 5,107,594 A * | 4/1992 | Ferreras | 30/372 |
| 5,136,909 A | 8/1992 | Mellick | |
| 5,141,211 A | 8/1992 | Adams, Jr. | |
| 5,146,826 A * | 9/1992 | Shiotani et al. | 83/468.2 |
| 5,161,443 A | 11/1992 | Huang | |
| 5,197,365 A * | 3/1993 | Clifton | 83/468 |
| 5,239,905 A * | 8/1993 | Dunn | 83/459 |
| 5,269,340 A * | 12/1993 | Drzewiecki | 137/318 |
| 5,692,426 A | 12/1997 | Alexander | |
| 5,720,096 A | 2/1998 | Dorsey | |
| 5,791,223 A * | 8/1998 | Lanzer | 83/471.3 |
| 5,863,035 A | 1/1999 | Howell | |
| 5,950,998 A * | 9/1999 | Crabb | 269/98 |
| 6,065,744 A | 5/2000 | Lawrence | |
| 6,205,897 B1 * | 3/2001 | Carter | 83/54 |
| 6,244,147 B1 | 6/2001 | Pierce | |
| 6,247,690 B1 | 6/2001 | Wolf | |
| 6,254,077 B1 | 7/2001 | Riley, Jr. | |
| 6,256,891 B1 | 7/2001 | Van Camp et al. | |
| 6,336,388 B1 | 1/2002 | Marocco | |
| 6,708,422 B1 * | 3/2004 | Stojanovski | 33/640 |
| 6,752,059 B1 * | 6/2004 | Posont | 83/745 |
| 6,829,972 B1 * | 12/2004 | Chen | 83/761 |
| 2003/0209107 A1 | 11/2003 | Dibbem, Jr. et al. | |
| 2003/0233925 A1 * | 12/2003 | Makropoulos | 83/829 |
| 2006/0090620 A1 * | 5/2006 | Leberfinger et al. | 83/452 |

* cited by examiner

PORTABLE VISE AND SAW COMBINATION

CROSS REFERENCE TO RELATED APPLICATION

This application is a CIP of patent application Ser. No. 10/773,781, filed on, Feb. 6, 2004 entitled "Portable Vise", the disclosure of which is incorporated by reference herein.

TECHNICAL FIELD

The present invention relates to the field of clamping devices that secure a workpiece, and more particularly, to a portable vise especially adapted for pipefitting to secure one or more workpieces that extend horizontally or vertically, and the vise further including an integral saw enabling the workpieces to be cut.

BACKGROUND OF THE INVENTION

There are numerous known clamping devices that allow an operator to hold and securely restrain a workpiece. One well-known clamping design is a vise clamp having one stationary jaw, and one movable jaw that may be adjusted to clamp the workpiece between the jaws.

Welders and pipe fitters often use a clamp to secure a workpiece such as a length of pipe that must be cut, or welded to another length of pipe. For example, in the construction of a commercial building, there is typically a complex network of piping that must be installed to deliver water to various locations within the building as well as to accommodate the removal of sewage. Successive lengths of pipe are welded to form such pipe networks. Because of the amount of pipe that must be routed through constrained spaces, adjoining pieces of pipe must be precisely aligned prior to welding to ensure that the runs of pipe fit within the constrained spaces set forth in the building design. For most pipe fitting operations, pipe runs are created so that there are primarily horizontal and vertical runs. These runs are interconnected by 90 elbows as necessary to change the direction of the runs.

Because of the weight and size of the sections of pipe to be installed, many of the sections must be assembled at a shop location away from the job site. A job site does not typically have a bench or support that is capable of securing the pipes for assembly. Thus, one continuing problem in pipefitting is the inability for a pipe fitter to assemble sections of pipe at the job site, or to otherwise rework the pipe at the job site.

My earlier U.S. Pat. No. 3,982,739 addressed some of these problems through a portable vise formed by a pair of intersecting plates connected to an orthogonally extending base having a v-shaped cross section. The intersecting plates form two v-shaped spaces and the base forms a third v-shaped space. Clamping flanges may extend from each of the plates as well as from the base. Each clamp member is positionable over its respective v-shaped space to act as a support or frame for a set screw. The set screw is threaded through the clamp and allows a workpiece to be held in the corresponding v-shaped space formed by the intersecting plates or the base.

Another example of a device that is adapted for securing pipe includes the device disclosed in U.S. Pat. No. 5,863,035. This reference discloses a clamping device capable of being mounted to a pipe jack for securing a workpiece, such as a length of pipe. A yoke member is adapted to engage a pipe jack having a v-shaped configuration, and also has a threaded orifice for receiving a threaded stem. A handle attaches to an upper end of the threaded stem. A jaw is attached to the lower end of the threaded stem and is engageable with the workpiece by manipulating the handle to force the jaw against the surface of the workpiece.

U.S. Pat. No. 5,950,998 discloses a portable cable vise especially adapted for securing cable. The vise includes a lower stationary jaw, an upper movable jaw, and means for moving the upper jaw toward and away from the stationary jaw to grip a length of cable between jaw members. The jaws have complimentary shaped recesses for receiving the cable to avoid crushing or damaging the cable. The vise further includes a c-shaped mounting clamp allowing the portable vise to be mounted to a support.

In pipefitting, it is also necessary to cut various lengths of pipes in order to create the pipe network that may be incorporated within a building. Preferably, pipe is cut at the jobsite; however, larger pipe sizes are often cut away from the jobsite because the power saw required to cut the pipe may only be incorporated on a large base or table. Typically, a circular saw, also commonly referred to as a "chop" saw, is used to cut pipe. Examples of references disclosing various types of circular saws include U.S. Pat. Nos. 5,161,443; 5,016,510; and 5,720,096.

While these inventions may be adequate for their intended purposes, none of these inventions incorporate the special features of the present invention as discussed below.

SUMMARY OF THE INVENTION

In accordance with the present invention, a portable vise and saw combination is provided that allows one or more workpieces to be secured in a desired horizontal or vertical orientation, and an integral saw that allows the workpieces to be cut. The portable vise includes three available attachment points. One clamp can be utilized to attach the portable vise to a support, another clamp can be used to secure a workpiece to the vise, and the remaining clamp can be used to secure the saw in an orientation that allows the saw to cut the workpiece. The particular construction of the clamps allows an operator to manipulate the clamps to force a movable jaw against the object to be clamped, yet the operator does not have to manually guide the jaw in order to ensure that it is aligned with the object.

Two of the attachment points on the vise are formed by two pairs of converging or v-shaped engaging surfaces that are oriented back to back. The pairs of engaging surfaces are also aligned in parallel to one another so that two workpieces or a support and a workpiece would thereby extend parallel to one another. The third attachment point is defined by another pair of v-shaped engaging surfaces that are oriented perpendicular or orthogonal to the two pairs of back to back engaging surfaces. The orthogonal pair of engaging surface and the two pair of back to back engaging surfaces are an integral unit defined as the body of the vise. A pair of slots are formed adjacent each pair of engaging surfaces allowing a clamp to be positioned over any one pair of the engaging surfaces. Accordingly, there are three pairs of slots enabling a total of three clamps to be used, if necessary.

The configuration of each of the clamps may include a threaded set screw that is received within a threaded opening in the frame of the clamp. The set screw is controlled by a handle that allows a user to move the free end of the set screw to and away from a workpiece placed on the corresponding v-shaped engaging surfaces. The free end of the set screw includes a jaw assembly that may contact and hold the workpiece when the set screw is manipulated. A yoke is used to interconnect the jaw assembly to the free end of the set screw. The yoke includes a pair of lateral extensions that are received within a pair of opposed guide channels formed on an inner surface of the frame of the clamp. The guide channels are formed in the clamp so that the jaw assembly moves toward and away from the workpiece perpendicular to the surface of the workpiece to be contacted. The yoke also includes a cavity that receives a flange of the jaw assembly. The cavity within the yoke is slightly larger than the flange. Accordingly, the jaw has some "play" thereby allowing the jaw to slightly shift or move when contacting a workpiece. The allowed "play" of the jaw enables an operator to secure a workpiece by simply manipulating the handle attached to the set screw. Thus, the operator does not have to manually hold the jaw to ensure that the jaw makes flush contact with the workpiece. Preferably, the jaw has a contact surface that is curved or arcuate thereby increasing the surface area of the jaw when contacting a cylindrical member such as a piece of pipe. Particularly for a jaw having a curved contact surface, without the aforementioned alignment features, the user must otherwise grasp the jaw to ensure that the jaw is properly oriented with the longitudinal axis of the piece of pipe when clamping the piece of pipe.

Although pairs of engaging surfaces have been shown and described, it may be desirable to provide engaging surfaces in other forms to best suit the particular type of workpiece to be secured. For example, the engaging surfaces may be offset from one another in a more parallel fashion, or the engaging surfaces could be one continuous engaging surface with a curved shape which best matches the outer surface of the workpiece to be secured. Therefore, a set of engaging surfaces can be two separated surfaces, or a continuous single surface.

The saw that is combined with the vise of the present invention is attached directly to the vise. In a preferred embodiment, the saw is mounted to a mounting device that interconnects the saw to the vise. The mounting device includes a base plate and a mounting member attached to the base plate. The mounting member can be a short length of pipe that is secured in a horizontally extending clamp of the vise. Any known circular saw, chop saw, or band saw, or chop saw may be mounted with a universal transistion base plate. The blade of the saw is oriented so that a workpiece that is placed within one of the other clamps of the vise may be cut by the saw. More specifically, the blade of the saw is oriented so that it may cut the workpiece at a desired angle to include 90°, 45°, and 22½°. The ability to selectively cut the workpiece at a desired angle is accommodated by an index plate that is mounted on the base plate. The index plate may be selectively rotated with respect to the base plate thereby orienting the blade of the saw at a desired angle with respect to the workpiece secured in the vise.

Optionally, an integral measuring device or measuring means is provided with the vise and saw combination enabling successive lengths of workpieces, such as pipe, to be cut without having to measure each pipe. The measuring means includes a measuring element or bar that is secured to the vise and extends in the same direction that the pipe extends. A first piece of pipe to be cut is placed within a clamp of the vise, and is measured for the desired size. The workpiece is then positioned in the clamp so that the blade of the saw will cut the pipe to the desired length. The measuring bar is positioned so that its measuring stop is set flush against one end of the pipe to be cut, and the measuring bar is then locked in place to thereby serve as a measuring device for the next length of pipe to be cut. The next length of pipe to be cut is simply placed within the clamp, one end of the pipe is set flush against the measuring stop, and then the pipe is secured in the clamp.

Other features and advantages of the invention will become apparent with a review of the accompanying figures, taken in conjunction with the detailed description.

DETAILED DESCRIPTION

Figure 1:
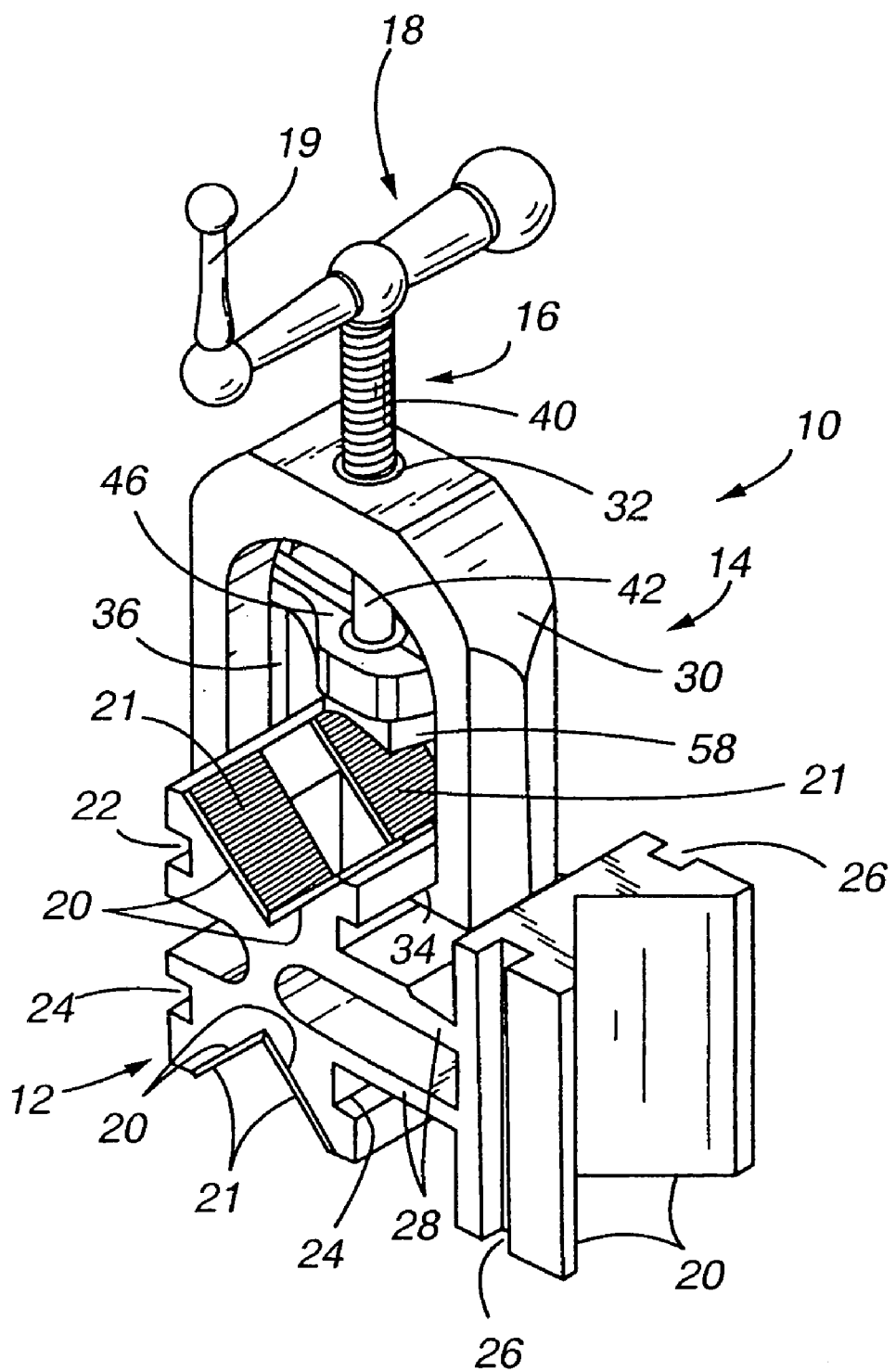
FIG. 1 is a perspective view of the portable vise used in the combination of the present invention.

FIG. 1 illustrates the portable vise that is used in the combination of the present invention. The major components of the vise 10 include a body 12, and one or more clamps 14 that enable the vise to be mounted to a support and to secure one or more workpieces. Beginning first with a description of a clamp 14, it includes a set screw 16 that is threadably received in a threaded collar 32 mounted in a frame 30 of the clamp. A handle 18 attaches to an end of the set screwing allowing an operator to manipulate the set screw 16 which in turn causes travel of the yoke 46. The handle 18 may optionally include a perpendicularly extending knob 19 which further assists an operator in manipulating the set screw.

The body 12 is defined by three pairs of v-shaped or converging engaging surfaces 20. Two pairs of the engaging surfaces are positioned back to back with one another. The third pair of v-shaped engaging surfaces are arranged orthogonally/perpendicularly with respect to the first two pairs of engaging surfaces. The third pair of engaging surfaces is offset in its orthogonal arrangement by an extension 28 that is integral with the body 12. Each pair of v-shaped engaging surfaces includes a corresponding pair of slots that are formed exteriorly of the v-shaped openings defined by the engaging surfaces. More specifically, slots 22, 24, and 26 are formed in the body of the clamp exteriorly and adjacent to each pair of engaging surfaces 20 as shown.

Figure 5:
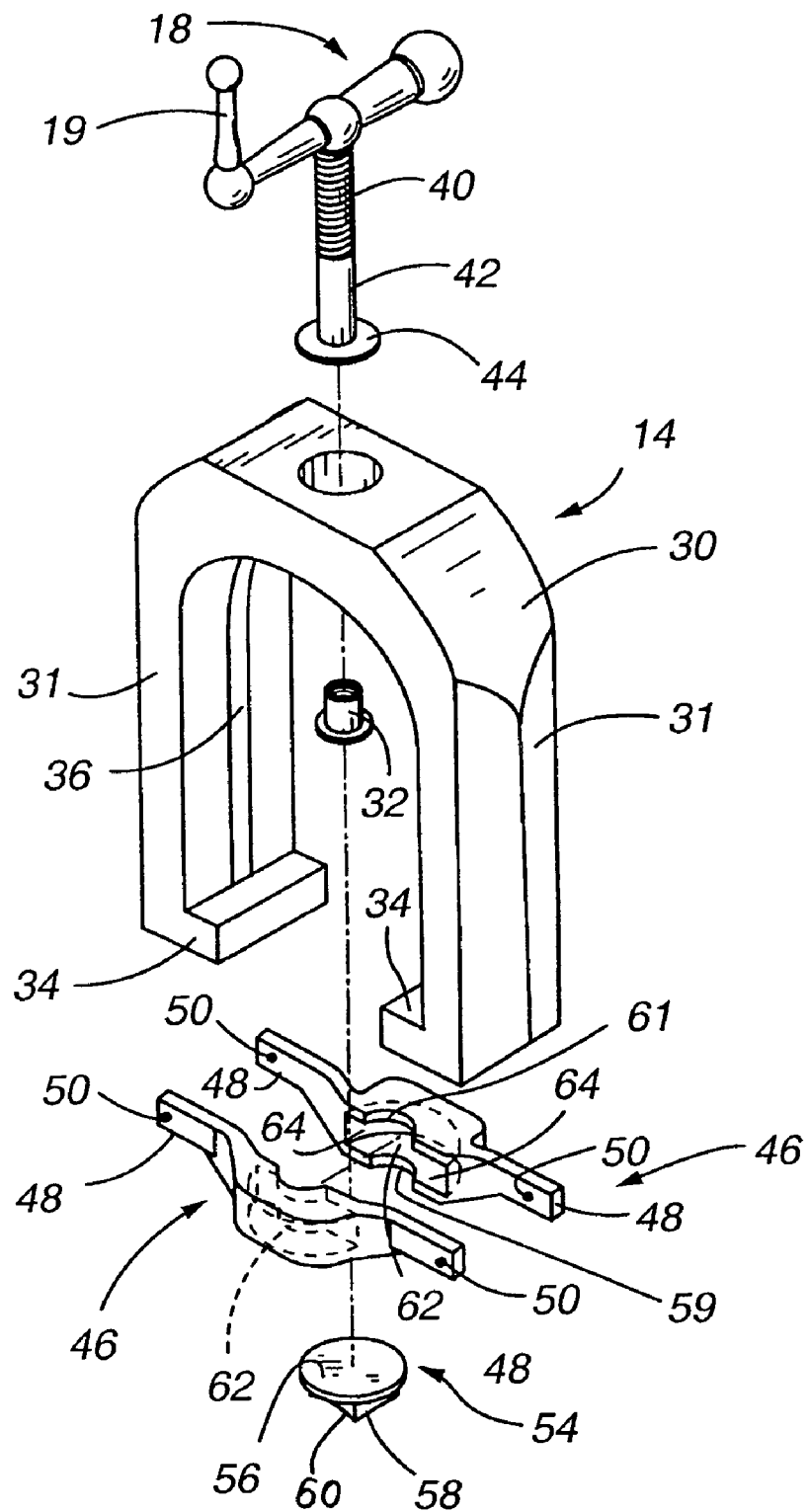
FIG. 5 is an exploded view of a clamp illustrating its components.

Referring also to FIG. 5, a clamp is shown in an exploded view to illustrate the components thereof. The frame 30 of the clamp includes a pair of legs 31 and engaging flanges or forks 34 that are placed within a pair of channels formed in the body of the vise, as further discussed below. An interior surface of the frame 30 includes a pair of opposing guide channels 36 that extend along the length of the legs 31. The set screw 16 is defined by a threaded portion 40 and a non-threaded extension 42. The free or distal end of the extension 42 has a flange 44 attached thereto. The yoke 46 attaches to the set screw wherein flange 44 is held within a cavity 62 of the yoke. Yoke 46 may be constructed of two mating pieces, each having a cavity formed therein to accommodate the capture of flange 44. The yoke 46 further includes a pair of extensions or ears 48 that are slidably received within the pair of guide channels 36. The two halves comprising the yoke 46 may be connected to one another as by a pair of fasteners/screws (not shown) that are received in screw holes 50. A jaw assembly 54 is also secured to the yoke 46. The jaw assembly 54 includes a flange 56, and a jaw 58. The jaw 58 may have a curved or arcuate engaging surface 60. The flange 56 is also retained in the cavity 62. As shown, cavity 62 includes a wider portion 64 that is sized to received both flanges 44 and 56. Jaw 58 protrudes through the opening 59 in the lower surface of the yoke 46. Extension 42 extends through an opening 61 formed in the upper surface of the yoke 46. The cavity 62 is sized so that there is a small gap that exists within the cavity even when the cavity has received the flanges 44 and 56. Accordingly, there is some looseness or "play" between yoke 46 and the set screw 16, and between yoke 46 and the jaw assembly 54.

Figure 2:
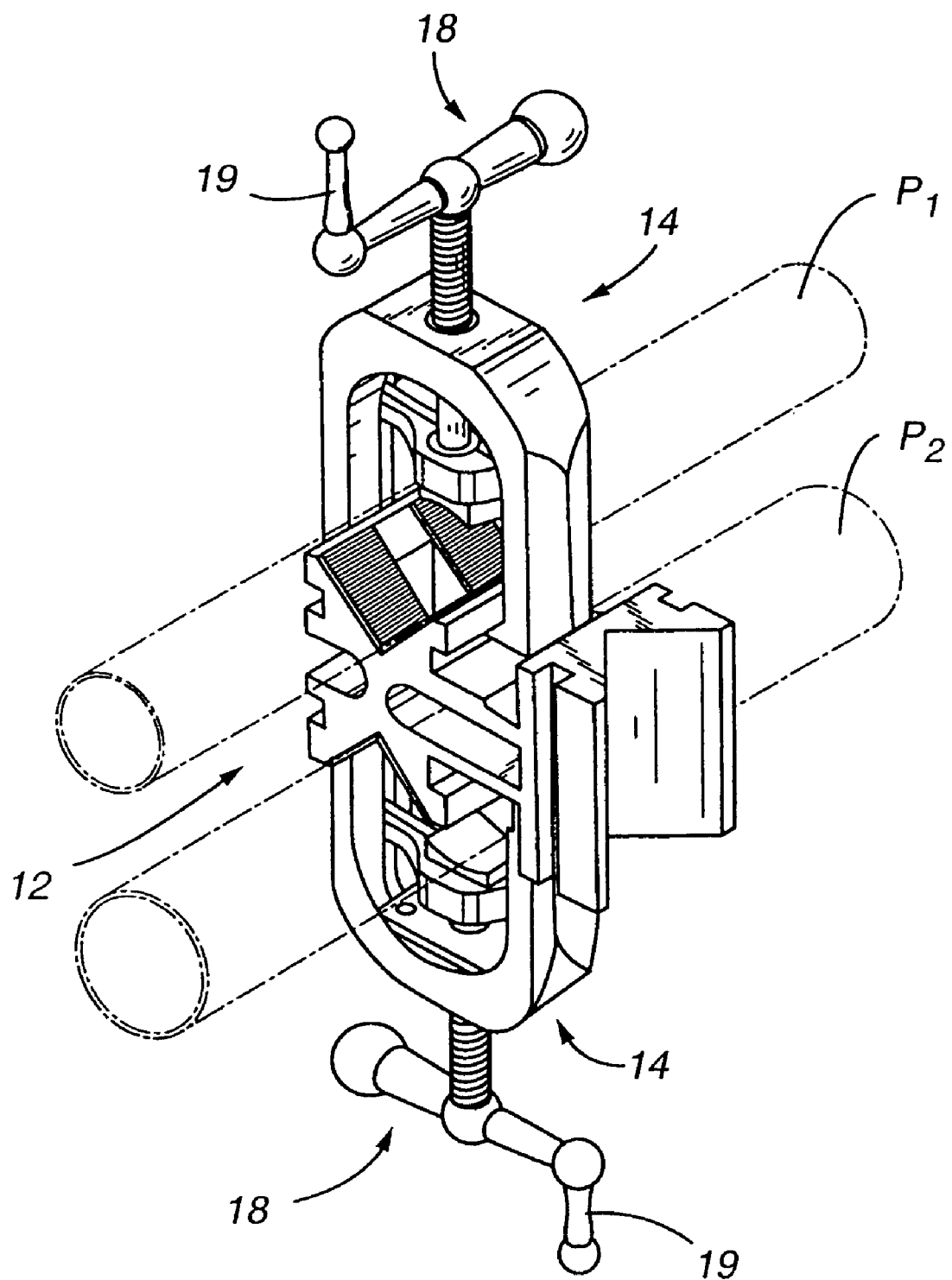
FIG. 2 is another perspective view of the portable vise illustrating a pair of clamps used to secure a pair of parallel extending pieces of pipe.
Figure 3:
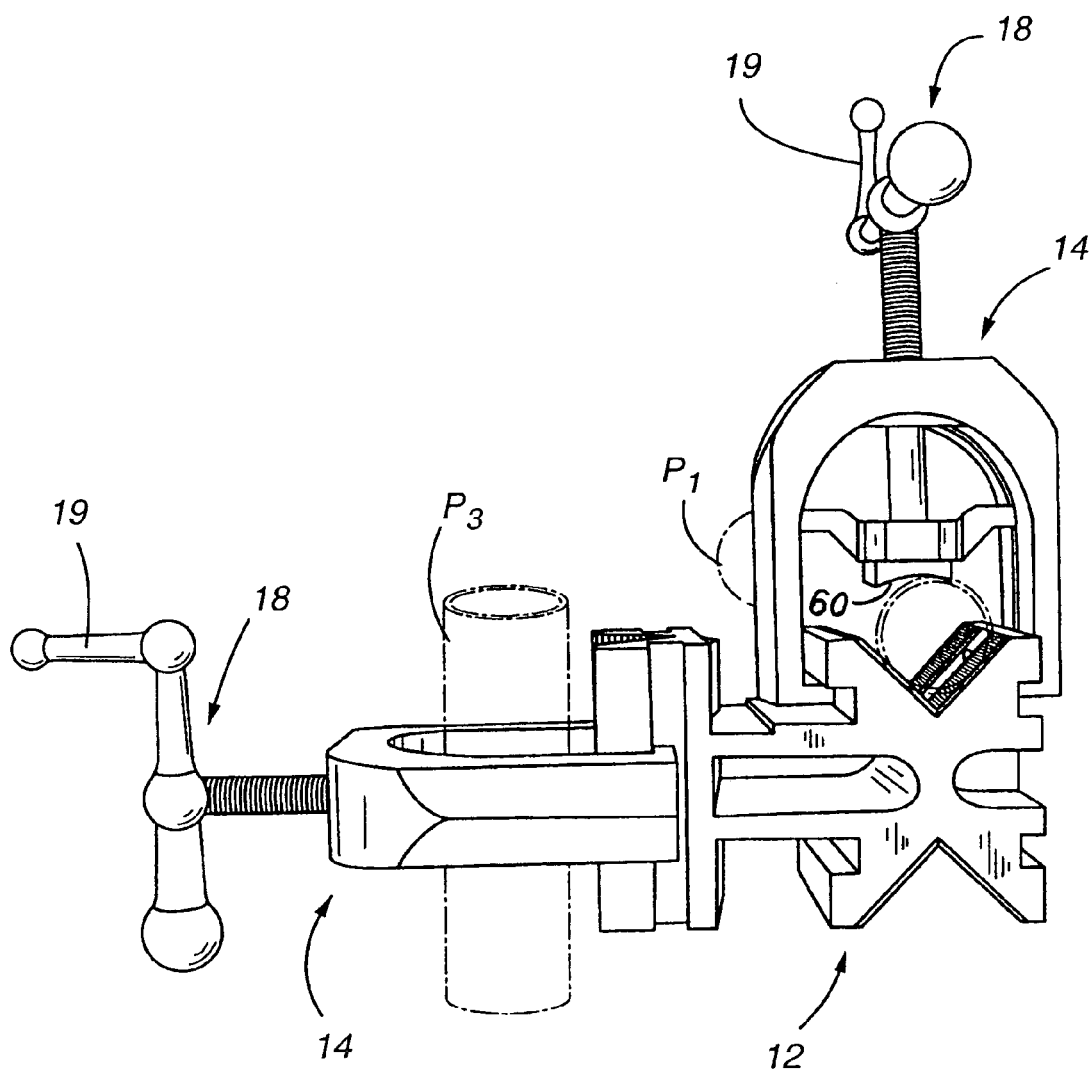
FIG. 3 is another perspective view of the portable vise, illustrating use of a pair of clamps wherein one clamp secures a workpiece or support in a vertical orientation, while securing either a support or a workpiece in a horizontal orientation.

Now referring to FIGS. 2–4, the operation of the clamp will be explained. Referring first to FIG. 2, a pair of clamps 14 are shown attached to the body of the vise wherein the clamps are installed over the back to back pairs of v-shaped engaging surfaces 20. The forks 34 of each clamp are simply inserted within the corresponding pairs of slots 22 and 24. Two pieces of pipe $P_1$ and $P_2$ are shown as being engaged by the clamps. The handles 18 are rotated so to close the jaw assemblies 54 in contact with the pipes. The curved engaging surfaces 60 of the jaws accommodate the exterior curvature of the pipes thereby increasing the surface area of the jaw that contacts the pipes. In the case of FIG. 2, either of the pipes could be the piece of pipe to be worked (i.e., welded, cut, etc.), while the other pipe would be the support to which the vise is mounted. Referring now to FIG. 3, a pair of clamps are also shown; however, one of the clamps is shown as being installed over the orthogonal pair of engaging surfaces that receive a vertically extending piece of pipe $P_3$. In the case of FIG. 3, the workpiece could be either the horizontally extending piece of pipe or the vertically extending piece of pipe, and the other piece of pipe would be the support.

Figure 4:
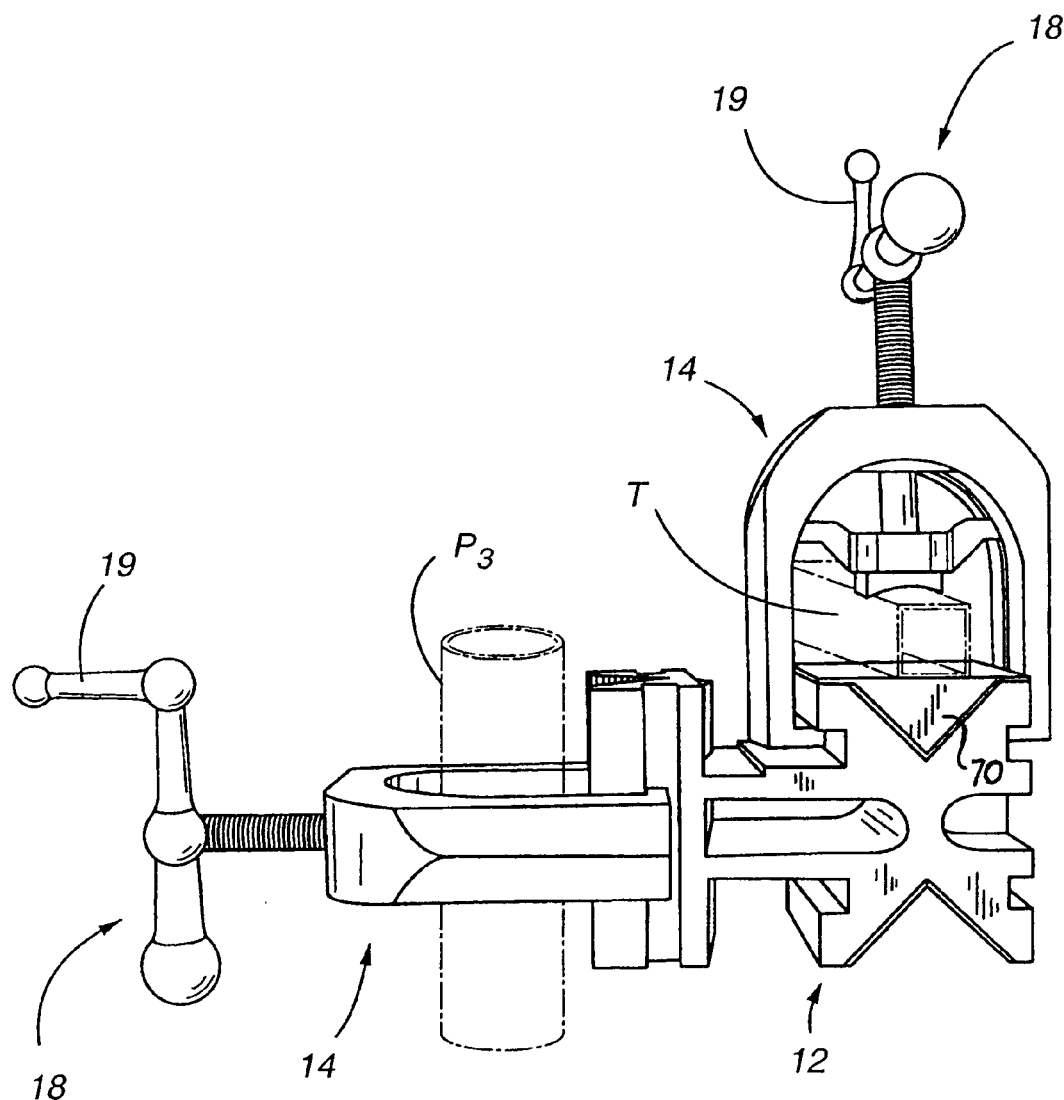
FIG. 4 is yet another perspective view similar to that of FIG. 3, but showing one of the clamps securing a square-shaped member, and use of a filler between the pair of engaging surfaces.

FIG. 4 illustrates the same arrangement of clamps as shown in FIG. 3; however, FIG. 4 shows the one clamp securing a piece of square tubing T as opposed to a piece of pipe. For securing a workpiece having a shape other than one with a circular cross section, a v-shaped filler 70 may be used to provide a flat engaging surface thereby increasing the surface area that is placed in contact with the clamp. A wearing plate, not shown, may also be installed to optimize the contact surface.

Optionally, wearing plates 21 may be installed over one or each of the v-shaped engaging surfaces 20. The purpose of the plates is to provide a contact surface with the desired characteristics in order to best secure a workpiece. In the case of iron or steel pipe members, it may be desirable to provide plates with grooved surfaces thereby increasing the frictional capacity of the clamp to prevent a pipe from spinning or otherwise shifting. Alternatively, the plates 21 could be smooth so as not to mar or otherwise damage the workpiece. For example, in the case of copper or stainless tubing, it is desirable to provide a smooth contact surface to thereby prevent potential damage to the copper tubing that might occur with the use of plates having grooved surfaces. The curved engaging surface 60 of the jaw may be smooth or may have a grooved surface like plates 21.

Yoke 46 provides a great advantage in allowing an operator to manipulate the handle 18 to secure the workpiece without having to a simultaneously grasp the jaw assembly. The jaw assembly is normally aligned so that the jaw naturally accommodates the curved exterior surface of a pipe member. As the set screw moves the yoke and jaw assembly closer to and in contact with the workpiece, the slight looseness or "play" in the jaw assembly allows the jaw assembly to naturally center itself on the workpiece. Thus, any slight misalignment between the workpiece and the jaw assembly is remedied by the ability of the jaw assembly to slightly shift or move. Thus, as the operator holds the workpiece in one hand, the operator simply secures the workpiece by using the other hand to rotate the handle 18. With the prior art, a stiff or rigid connection exists between a jaw and the member which moves the jaw in contact with the workpiece. Accordingly, there is no means to automatically correct any misalignment between the jaw and the workpiece thereby forcing the operator to use both hands to manipulate the vise. Once the jaw has been tightened against the workpiece, further shifting of the jaw is prevented because the contact of flange 44 with the yoke 46 and the contact of the flange 56 with the yoke 46 is provided with enough pressure so that these pieces are locked with one another. The arrangement of the yoke and jaw assembly in the present invention provides an operator with better control over a workpiece to be secured by a vise thereby increasing efficiency and safety.

The vise heretofore described is portable, can be easily carried to the job site, and can be mounted on any bar, handrail, or stanchion, either horizontally or vertically. Thus, a workpiece may be worked on at the job site and need not be worked on at a remote shop location. The vise can be used to hold pipe, tubing, flat bars, angle iron or any other shaped workpieces. One person can easily mount the vise to a stanchion or other support, and can independently secure a workpiece without assistance. The vise can be easily detached and moved to any other location within the work area. When a clamp is tightened on the stanchion or support, the workpiece is nested in a level or plum position either paralleling the support or placing the workpiece in a perpendicular arrangement to the support. Accordingly, the workpiece is immediately ready for attachment to an existing length of pipe without having to plum and orient the workpiece.

The body of the vise may be cast or molded from a desired metal or alloy. In practice, it has been found that the body and clamps of the vise may be made from cast aluminum. Cast aluminum is both lightweight and has high strength enabling the vise to adequately secure quite heavy workpieces.

Figure 6:
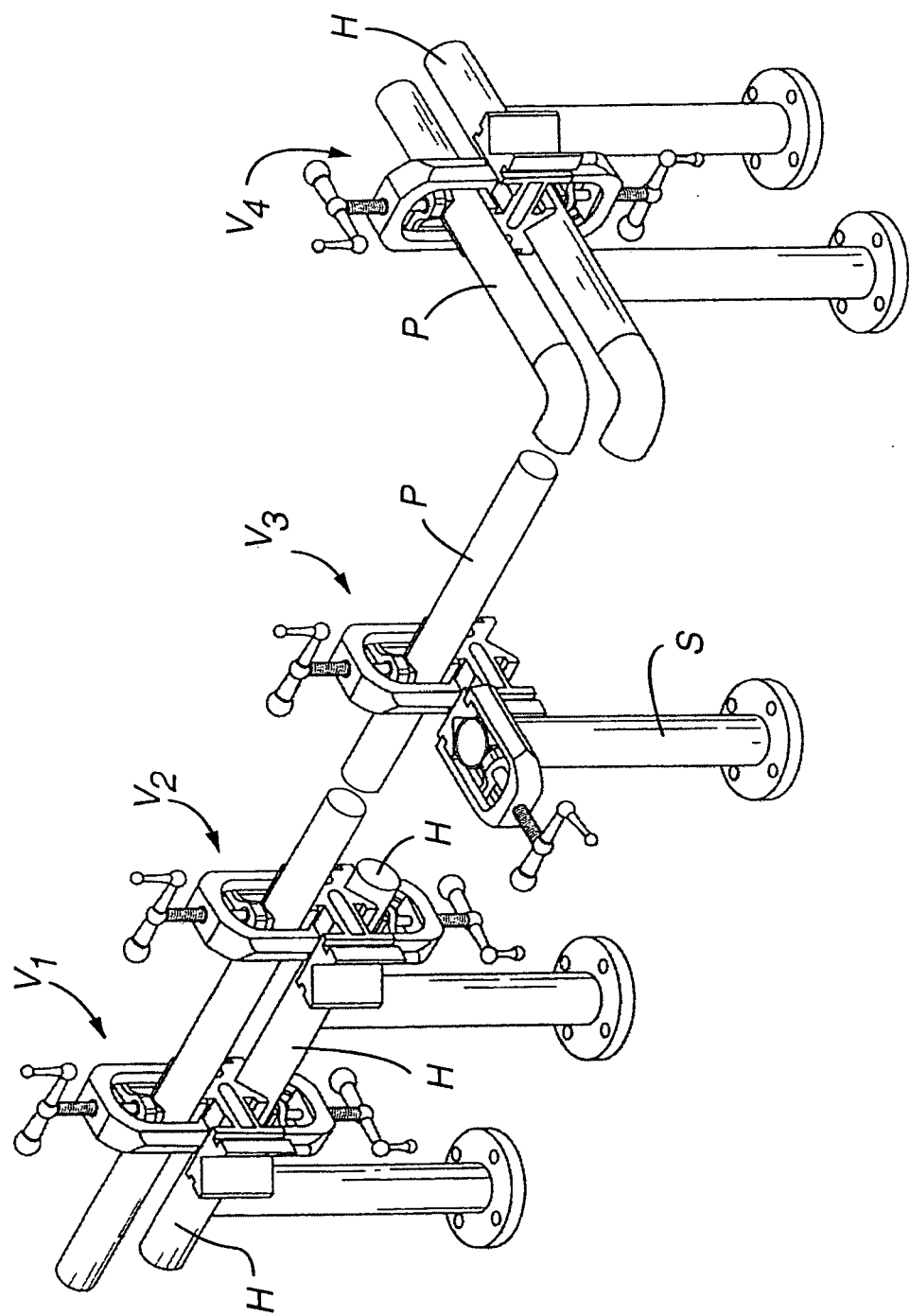
FIG. 6 is a perspective view illustrating a plurality of portable vises used within the construction of a particular pipe network.

FIG. 6 illustrates a plurality of portable vises that are installed at a worksite. Vises $V_1$, $V_2$, and $V_3$ are shown mounted to corresponding horizontal handrails H, and each securing a horizontal lengths of pipe P. A fourth vise $V_4$ is also shown spaced from the third vise $V_3$, the fourth vise being mounted to a vertical extension from stanchion S and securing another horizontal length of pipe P. Thus, FIG. 6 illustrates one example of how a combination of the vises may be used at a work site to secure various workpieces.

Figure 7:
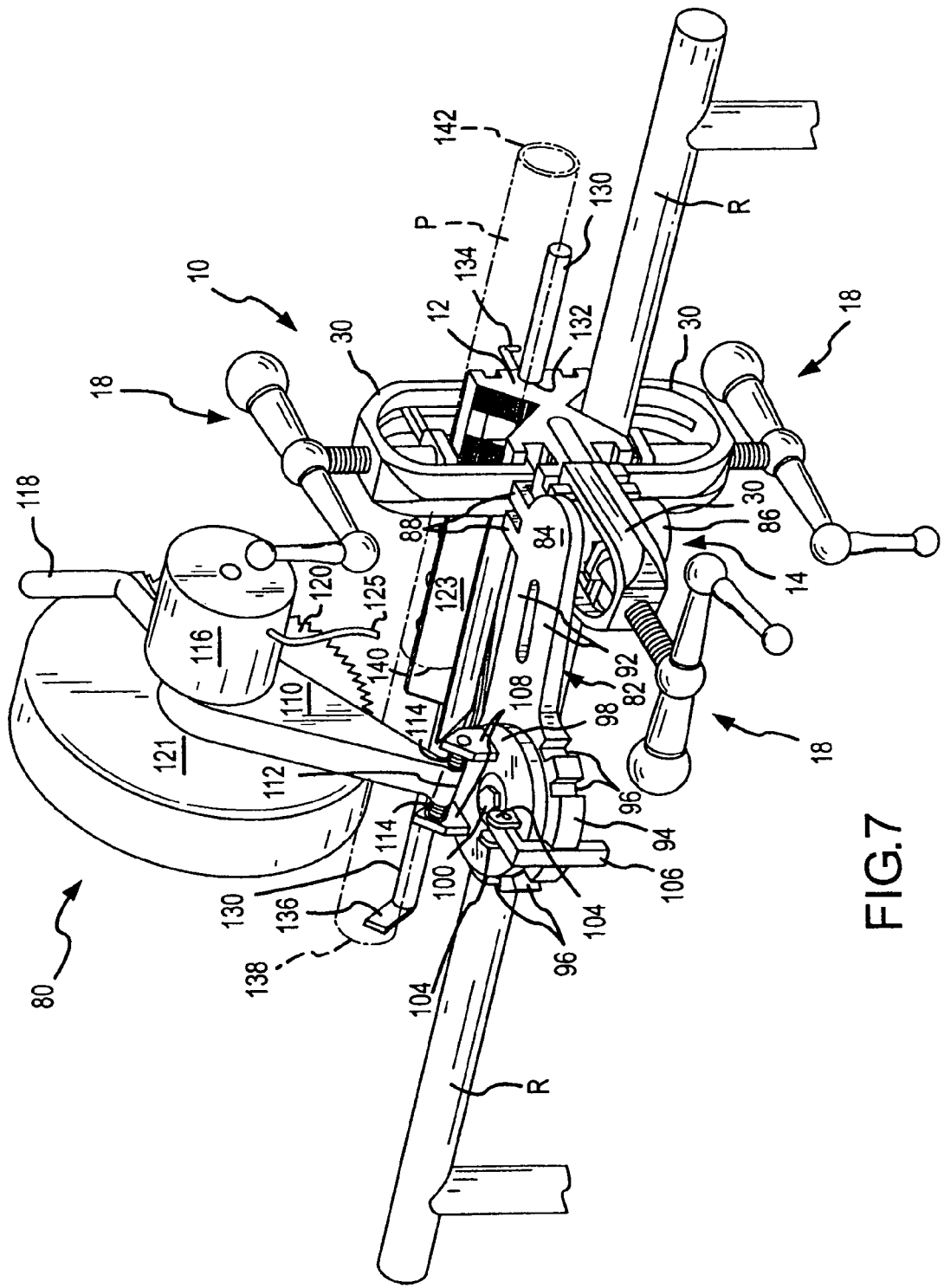
FIG. 7 is a perspective view of the vise and saw combination of the present invention.
Figure 8:
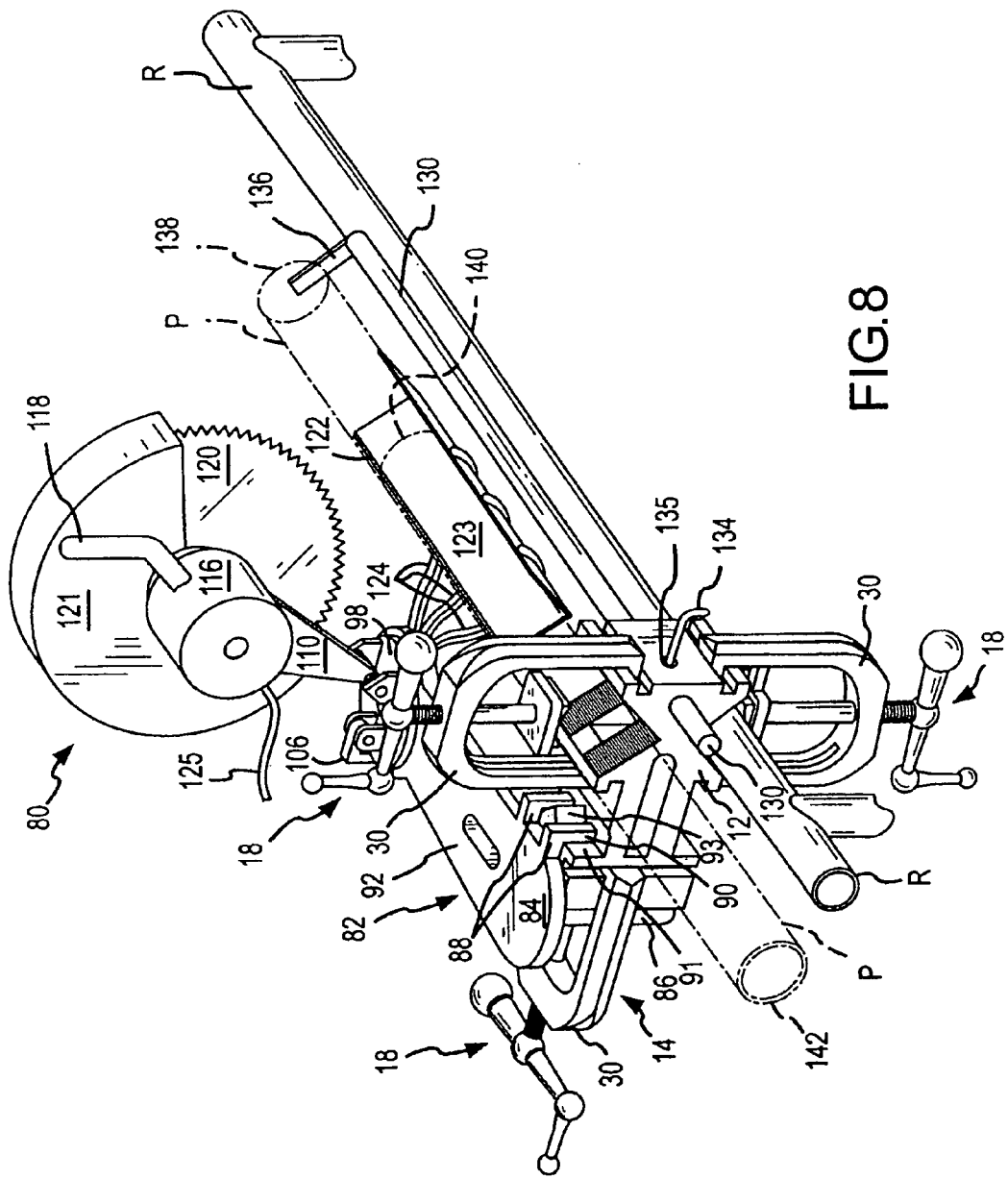
FIG. 8 is a reverse perspective view of the vise and saw combination.
Figure 9:
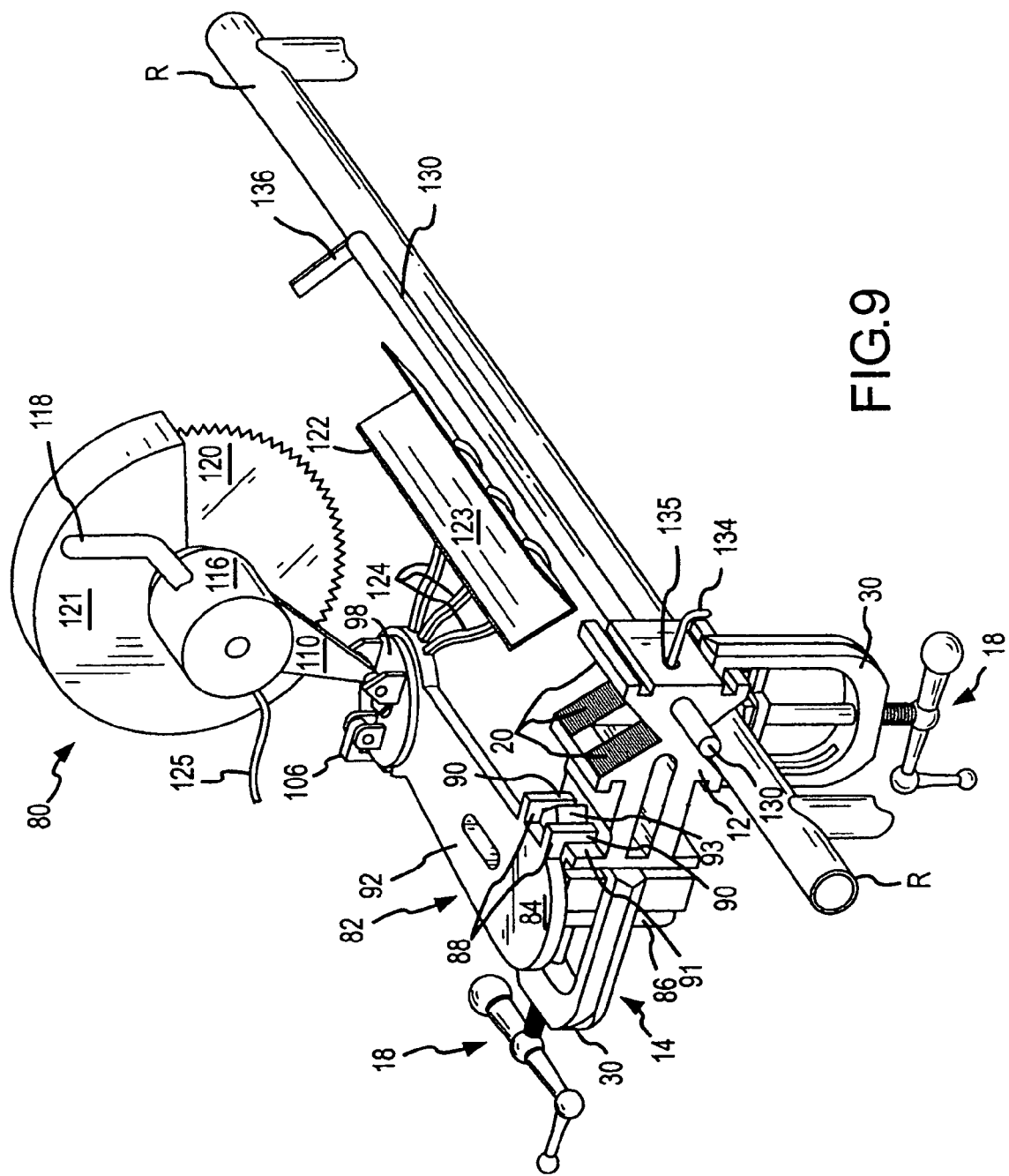
FIG. 9 is another reverse perspective view with the upper clamp of the vise removed in order to better view the attachment of the saw to the vise.

Referring now to FIGS. 7–9, the combination of the present invention is shown wherein the vise 10 is mounted to a horizontally existing rail R, and a saw assembly 80 is mounted to the vise 10. The particular type of saw illustrated is simply representative of any well known circular saw. The particular saw illustrated includes a motor housing 116, a handle 118, a blade 120, and a blade cover 121. Power may be provided to the saw by a conventional power cord 125.

The saw assembly 80 includes a base plate 82 that is oriented horizontally. The base plate 82 includes a first end 84 having a mounting member 86 in the form of a short length of pipe or tubing welded perpendicularly to base plate 82. Member 86 is secured within the horizontally extending clamp 14.

The saw assembly 80 is further characterized by a neck or extension 92 of the base plate 82 that extends in the direction of the workpiece to be cut. The second or opposite end 94 of the base plate 82 has a rounded or semicircular shape with a plurality of slots or channels 96 formed on an exterior edge thereof. The saw attaches to the base plate 82 by an indexing plate 98. Indexing plate 98 is mounted over the base plate 82. Indexing plate 98 may be rotated with respect to the base plate 82 by use of a pinned connection between the two members. In the preferred embodiment, this pinned connection is achieved by use of a bolt or pin 100 secured by a nut (not shown) positioned under the base plate 82.

A user may selectively position the angle at which the saw makes a cut on the workpiece, shown as a piece of pipe P. In FIGS. 7 and 8, the saw is illustrated to make a 90° cut with respect to the longitudinal axis of the piece of pipe P. A positioning handle 106 is attached to the indexing plate 98 as by a pair of brackets 104 and a pin that secures the rotatable end of the handle 106 between brackets 104. Handle 106 may be rotated from its locked or engaged position as shown in FIG. 7 to an unlocked position by lifting the handle out of the slot 96. To alter the angle of cut, the user unlocks the handle, and rotates the saw so that the handle is aligned with the slot 96 corresponding to the desired angle of cut. The handle is then rotated down and secured in the selected slot. The two slots immediately adjacent the 90° slot may result in positioning of the saw for 45° cuts, while the pair of outside slots may result in positioning of the saw for 22½° *cuts*. *In* pipefitting *operations*, the most common cuts that are required are at 45° and 90°. The slots 96 may be arranged and spaced from one another along the exterior edge of the base plate in any desired arrangement thereby providing an operator with the capability to make a desired angled cut.

In order that an operator may raise and lower the saw, the saw 80 includes a rotatable mounting arrangement facilitated by a pair of brackets 108 mounted to the indexing plate 98, and a pin that secures saw arm 110 by securing attachment end 112 between the brackets 108. End 112 has an opening formed therethrough for receiving the pin. As necessary, one or more springs 114 may also be incorporated on the mounting arrangement thereby placing the saw in a normally raised position and providing some resistance when the saw is rotated downward to make contact with the workpiece.

Optionally, base plate 82 may also include a pair of stabilizers or attaching forks 88 that are used to align the saw with the workpiece. As best seen in FIG. 7, the stabilizers 88 are sized so that their distal ends or extensions 90 are capable of extending over the rear flange 91 of the body 12 of the clamp. Flange 91 may include a wedge or V-shaped extension 93 that allows the stabilizers 88 to be centered and aligned over the flange 91. The stabilizers 88 extend perpendicular to the long axis of the base plate 82. When the stabilizers are positioned to engage the flange 91, the mounting member 86 cannot be rotated within the clamp which would otherwise alter the location of the saw 80, and which would therefore result in cuts in the workpiece that were not accurate.

In order to stabilize the length of pipe P as the pipe is manipulated to place it in the exact position to be cut, a support tray or cradle 122 may be provided. This tray 122 may include a plurality of support arms 124 that interconnect the tray 122 to the base plate 82. The tray 122 is aligned with the engaging surfaces 20 of the vise so that a workpiece will set flush against both the contact surface 123 of the tray 122 and the engaging surfaces 20 of the vise. Depending upon the particular diameter and shape of the workpiece to be cut, mounting member 86 may have to be slightly raised or lowered within the clamp to precisely align the tray with the engaging surfaces 20.

In order to accommodate successive cuts of various workpieces, a measuring device may be incorporated within the vise thereby preventing an operator from having to individually measure each workpiece to be cut when multiple workpieces are required to be cut to the same length. Referring again to FIGS. 7 and 8, the measuring device includes a measuring element or bar 130 that is received through an opening 132 formed in the body 12 of the vise. A securing pin 134 is used to hold the measuring bar at a selected position. Pin 134 is simply inserted into an orthogonal opening 135 also formed in the body of the vise. Accordingly the body of the vise around the location of the opening could be solid, as opposed to a slot or channel being formed at that area as shown in the previous figures. To hold the measuring bar in place, the end of the pin 134 is manipulated to make contact with the measuring bar 130. Pin 134 may be threaded in the orthogonal opening 135 and thus rotated to engage/disengage the measuring bar 130. The measuring bar further includes a measuring stop 136 which is simply a perpendicularly extending member which contacts an end of the workpiece to be cut.

When an operator desires to cut a workpiece, such as a length of pipe, the operator would insert the pipe through the clamp and rest the pipe on tray 122 and the pair of engaging surfaces 20. The operator would then pull down on the handle 118 of the saw to determine the location at which the saw will make a cut, indicated by contact or cut line 140. The pipe would then be shifted to position it at the exact location where the pipe must be cut to obtain the desired length. The operator would then secure the pipe in the clamp by tightening the handle 18 of the clamp. The operator could then place the measuring stop 136 flush against end 138 of the pipe. The measuring bar can then be locked in place by manipulating pin 134. The distance between the measuring stop 136 and the contact line 140 represents the desired length of pipe. To obtain a duplicate length of pipe, the operator would simply place the new section of pipe so that one end was flush against stop 136. The new section of pipe would be secured in the clamp, and then the cut could be made.

The length of the measuring bar 130 can be adapted to accommodate particular lengths of pipe that need to be cut. For long sections of pipe, it may be advantageous to reverse the positioning of the measuring stop 136 by reversing the direction in which the measuring bar is inserted through opening 132. Thus, the length of pipe to be cut would be measured between the contact line 140 and the opposite end of the pipe 142 that contacts the measuring stop 136.

The combination of the present invention is ideal for being able to cut workpieces at the exact location where the workpieces are to be installed. For example, the length of pipe P shown in FIG. 7 could be any one of the horizontally extending lengths of pipe shown in the pipe system of FIG. 6, thereby preventing an operator from having to cut the pipe at another location and then also aligning the pipe for installation in the system.

Also in accordance with the present invention, a method is provided for preparing a workpiece to be installed in a system of assembled workpieces. The system of assembled workpieces can be any group of workpieces that are welded, joined or otherwise attached to one another to form an operable system, such as a pipe system that may be found in a home or commercial building. The system could also include a wood or steel frame for a home or commercial building. The method utilizes the unique features of the saw and vise combination of the present invention. The vise is first installed on an existing support or a workpiece that has already been incorporated within the system. As described above, the saw is attached to the vise by one of the clamps. The workpiece to be installed is secured to the vise by another clamp. As necessary, the workpiece may then be cut to a desired length and then installed in the system. Particularly for piping systems, the workpiece may be able to be installed in the system after the workpiece has been cut without having to move the vise. For example, the existing rail could correspond to any one of the horizontally extending pipes or rails shown in the pipe system of FIG. 6. The vise can be positioned so there is enough room for the saw to be used for cutting, and then the pipe may then be directly attached to the existing system by repositioning the length of pipe within the clamp. Thus, the vise and saw do not have to be repositioned to install the workpiece, and the vise can be used to secure the workpiece as it is being installed. Accordingly, preparing the workpiece to be installed as well as the actual installation of the workpiece may be achieved with a single device that can be used on the jobsite.

The present invention has been disclosed in connection with various preferred embodiments; however, various changes and modifications are contemplated within the spirit and scope of the present invention as claimed.

What is claimed is:

1. A portable saw base assembly for use with a power saw for angle and compound cuts of workpieces comprising in operative combination:
   a) an elongated, generally planar base plate having a first end and a second end, a top face, a bottom face and front and back side edges;
   b) a mounting member secured to the bottom face of said base plate adjacent said first end thereof, said mounting member being oriented generally normal to the plane of said base plate and projecting downwardly to permit securing said mounting member in a vertical orientation in a vice so that said base plate is both cantilevered from said vice and oriented generally horizontally, and a workpiece to be cut is oriented generally parallel to said front edge;
   c) an index plate pivotally secured to the top face of said base plate adjacent said second end therof, said index plate having a top face; and
   d) a saw mounting member secured to said top face of said index plate for pivotally mounting a power saw so that saw is movable in a downward cutting arc.

2. A portable saw base assembly as in claim 1 wherein said index plate includes a lockable handle permitting said index plate to lockingly orient said saw with respect to said base plate for preselected cuts at an angle to said front edge to permit cutting said workpiece at said preselected angle.

3. A portable saw base assembly as in claim 2 wherein said saw mounting member comprises a generally vertically oriented bracket having a pivot pin for mounting said saw thereon.

4. A portable saw base assembly as in claim 3 wherein said mounting member comprises a cylindrically shaped pipe or rod, and wherein said front edge of said base plate includes at least one fork member adjacent to and spaced from said mounting member to engage a portion of said vice to assist in stabilizing said base plate.

5. A portable saw base assembly as in claim 1 which includes a workpiece supporting tray securable to a workpiece securing vice, said tray being oriented generally parallel to the front edge of said base plate.

6. A portable saw base assembly as in claim 2 wherein said base plate and said lockable handle cooperate to permit said saw to be locked in selected ones of a plurality of preselected angles, including at least one of left and right in the range of from $22\frac{1}{2}°$ to $90°$.

7. A portable saw base assembly as in claim 1 which includes an adjustable length measuring member disposed adjacent said front edge so that the length of a workpiece to be cut can be gauged.

8. A portable saw base assembly as in claim 7 wherein said length measuring member includes a stop flange adjacent said saw location and a locking member to lock said measuring member at a selected length.

9. A portable saw base assembly as in claim 1 wherein said power saw includes an arm member adapted to be receivingly engaged by said saw mounting member of said index plate and permitting arcuate cut off motion of a saw blade of said saw and oriented a distance from a workpiece held parallel to said saw base plate front edge to permit cutting through said workpiece.

* * * * *